UNITED STATES PATENT OFFICE.

GEORG ERDMANN, OF BERLIN, GERMANY.

PROCESS OF CLEANING BEER-YEAST.

1,045,689.  Specification of Letters Patent.  Patented Nov. 26, 1912.

No Drawing.  Application filed June 2, 1911. Serial No. 630,797.

*To all whom it may concern:*

Be it known that I, GEORG ERDMANN, a citizen of the German Empire, residing at Berlin, in the Kingdom of Prussia, Germany, manufacturer, have invented certain new and useful Improvements in a Process of Cleaning Beer-Yeast; and I do hereby declare the following to be a full, clear, and exact description of the invention, such as will enable others skilled in the art to which it appertains to make and use the same.

My invention relates to improvements in a process of cleaning beer yeast. The waste yeast of breweries contains bitter substances of hop which when using the yeast in bakeries has an objectionable influence on the taste of the bread. For this reason it has heretofore been suggested to remove the bitterness of the yeast by treating the same with warm water. I have discovered that the process of removing the bitterness of yeast by means of warm water is considerably improved by subjecting the said yeast, prior to the treatment with warm water, to intense aeration by passing therethrough a strong current of air, and preferably of filtered air, and continuing such aeration while treating the yeast with warm water. I have also discovered, that the process is further improved when using water of a temperature of not more than about 30 degrees centigrade.

For the purpose of preserving the yeast from which the bitterness has thus been removed, I prefer to treat the same with a weak solution of an organic acid, and preferably of a fruit acid, such for example as tartaric acid, while aerating the same. Good results have been obtained by subjecting the suspension of the yeast in water which has been obtained by aerating and treating the same with warm water to an electric current, for example to an induction current, whereby the bacteria are destroyed and the yeast can be preserved for a long time. In the preferred form of the process the said electric current is brought to act on the yeast while treating the same with a weak solution of an organic acid as described. However, it should be understood, that for treating the yeast with an electric current it is not absolutely necessary to add an acid thereto.

The treatment of the yeast with the electric current takes place preferably in the vat or other receptacle, which contains the yeast which has been subjected to the preliminary treatment and after the washings, etc. The current should be of such a strength and character as to decompose the water, whereby all bacteria are very soon killed, without affecting the yeast cells, which latter offer a great resistance to the current. As a rule half an hour's treatment is sufficient to kill all bacteria.

The yeast which has thus been freed of the bitter substances of hop is separated from the water whereupon some apple ether or another suitable fruit ether is added, whereby an agreeable odor is imparted thereto and its taste resembles that of an apple.

The waste yeast of breweries which has thus been treated is particularly suitable for use in bakeries, and in this respect it has the same value as the yeast from distilleries.

I claim herein as my invention:

1. The herein described process of cleaning yeast, which consists in aerating the yeast, treating the same with water of a temperature of not more than 30 degrees centigrade, while continuing aeration, treating the same with an organic acid, subjecting the suspension obtained to the influence of an electric current, separating the liquid, and adding fruit ether.

2. The herein described process of cleaning yeast which consists in aerating the yeast, treating the same with water, treating the yeast thus treated with an organic acid, and subjecting the yeast to the action of an electric current.

3. The herein described process of cleaning yeast, which consists in aerating the yeast, treating the same with water, and subjecting the yeast thus treated to the action of an electric current.

In testimony whereof I affix my signature in presence of two witnesses.

GEORG ERDMANN.

Witnesses:
 HENRY HASPER,
 WOLDEMAR HAUPT.